Oct. 29, 1957  J. M. REDMOND, JR  2,811,092
ASPIRATING APPARATUS AND VALVE THEREFOR
Filed June 11, 1952  2 Sheets-Sheet 1
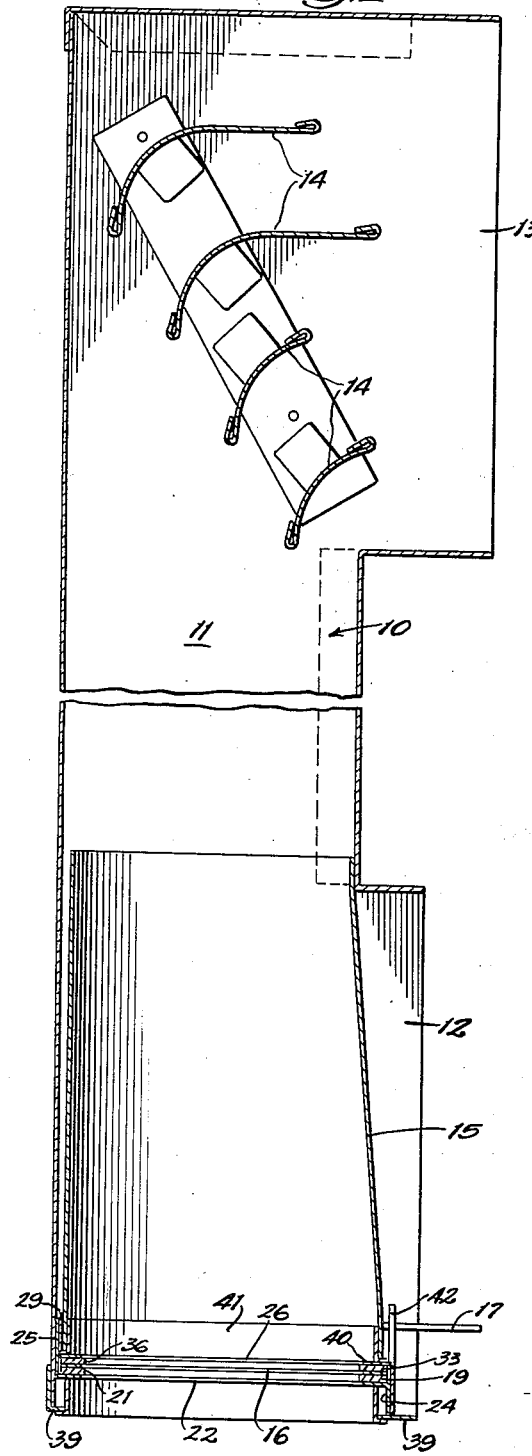
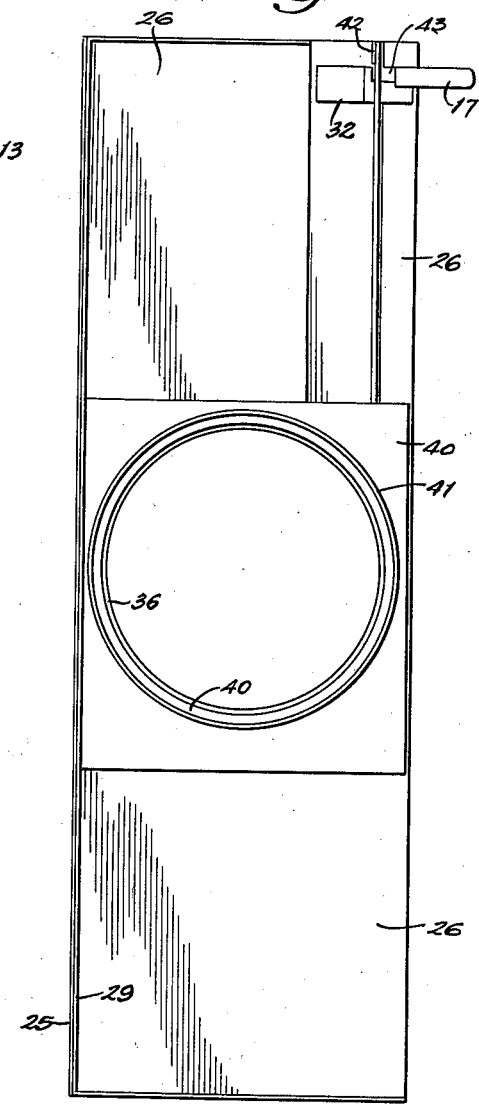
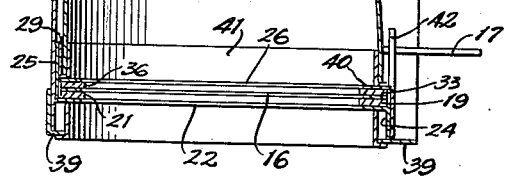
INVENTOR.
John M. Redmond Jr.,
BY
Dawson & Ooms
ATTORNEYS.

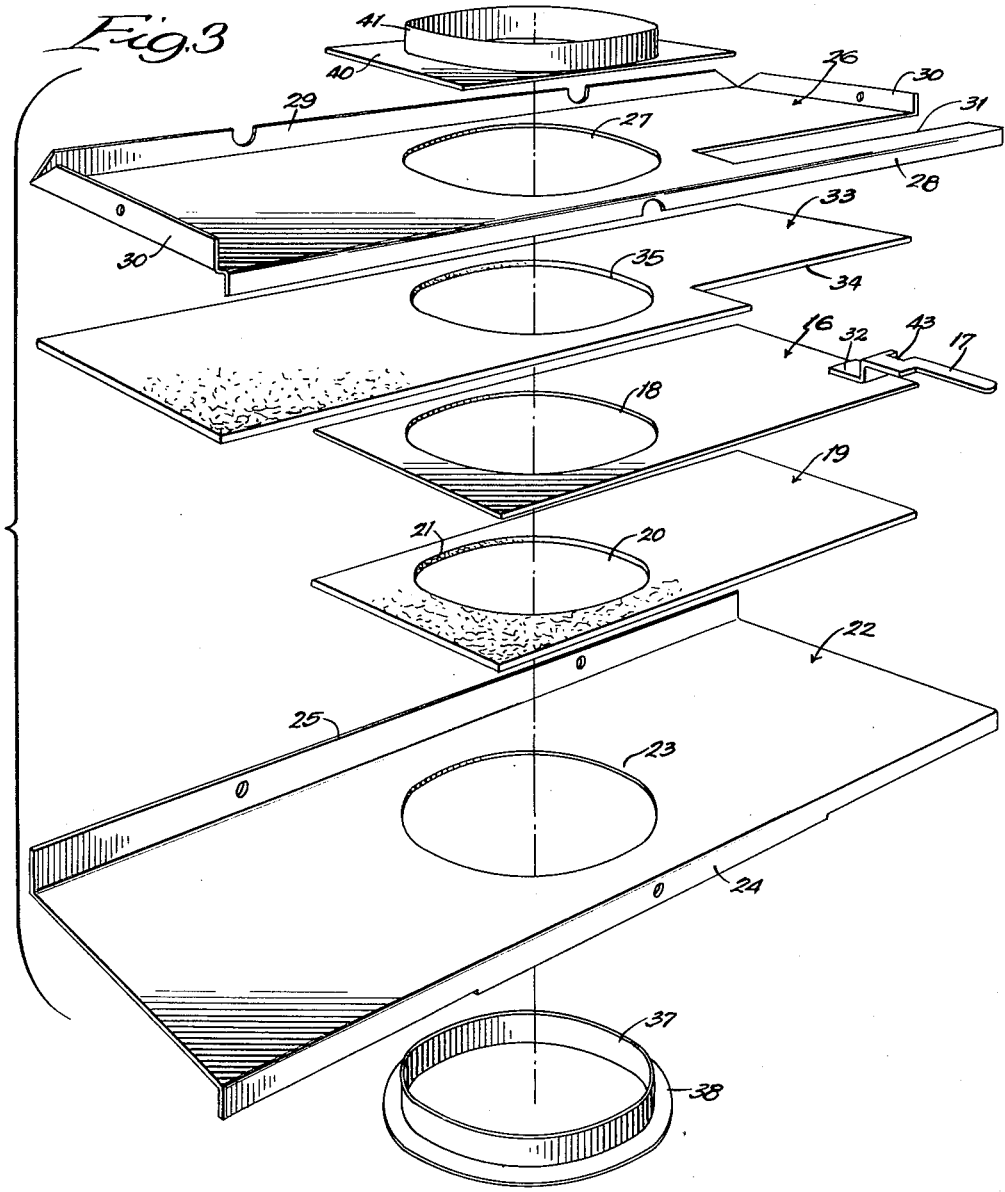

United States Patent Office 2,811,092
Patented Oct. 29, 1957

2,811,092

ASPIRATING APPARATUS AND VALVE THEREFOR

John M. Redmond, Jr., Wichita, Kans., assignor to The Coleman Company, Inc., Wichita, Kans., a corporation of Kansas Application June 11, 1952, Serial No. 292,958

11 Claims. (Cl. 98—38)

This invention relates to aspirating apparatus and valve therefor. The invention is particularly useful in the control of heated, high velocity air passing through a discharge conduit into a mixer chamber into which air is drawn from a room for mixing with the high velocity air. The invention, however, is applicable to other uses.

In air-mixing devices in which highly-heated air is passed into a mixer chamber under high velocity adjacent an intake opening for the drawing of air through the intake opening so that the indrawn air may be mixed with the heated air and then discharged through another opening, it has been common to employ a disc valve rotatably mounted on a shaft within the discharge conduit. Upon rotating the circular valve, air is discharged on both sides of the valve, forming two streams which enter the aspirating chamber above. The two streams encounter greater frictional areas and also produce much greater turbulence. It is found that the turbulence tends to greatly weaken the aspirating efficiency.

It has further been found in the valves or dampers employed for controlling the flow of high velocity air in aspirating devices, that whistling and other noises are produced by the flow of the air past the edges of the valve, and a successful elimination of such noise has not been brought about.

An object of the present invention is to provide a control for the discharge conduit which not only eliminates noise but also greatly increases the aspirating efficiency of the structure. A further object is to provide means for controlling the flow of air from a discharge conduit whereby the discharged air is in one single stream and in which the cross-section of the stream may be varied while still keeping the stream in a generally circular or elliptical shape, whereby turbulence is avoided and the aspirating efficiency of the device is greatly increased. Yet another object is to provide in such a structure means for sealing the movable parts of the valve structure against leakage while eliminating noise caused by the high velocity flow of air or by movement of the parts in the valve structure and while maintaining a centered discharge stream within the conduit. Other specific objects and advantages will appear as the specification proceeds.

The invention is shown in an illustrative embodiment by the accompanying drawings, in which—

Figure 1 is a broken vertical sectional view of an air-mixer or aspirating apparatus and valve mechanism for controlling the same in accordance with my invention; Fig. 2, a top plan view of the valve mechanism with the parts thereof in assembled relation; and Fig. 3, a perspective view showing the various parts of the valve structure in spaced-apart relation.

In the illustration given, 10 designates a vertical casing adapted to be placed between joists within a wall and providing therein an air mixer chamber 11. The casing is provided with an air-intake opening 12 at the bottom thereof and an air-discharge opening 13 at the top thereof. If desired, the casing may be provided near the top with turning vanes 14. The casing 10 is generally rectangular in cross-section and may be formed in any suitable manner as by folding a metal sheet along spaced-apart lines to provide forwardly-extending side walls and securing thereto a flange-equipped top wall and center forward wall; the flanges being indicated by dotted lines in Fig. 1. Centered within the lower portion of the casing 10 is a discharge pipe or aspirating nozzle 15, as shown more clearly in Figs. 1 and 2, the diameter of the nozzle being considerably smaller than the width of opening 12 so as to provide minimum resistance to the flow of air therethrough. In the embodiment shown as an illustration, heated air is discharged at high velocity through the conduit 15 into the elongated mixing chamber 11. The upward flow of the high velocity air through chamber 11 causes room air to flow inwardly through the inlet 12, and after admixture with the heated air, there is a discharge of the mixed air through outlet 13 into the room. Since this type of structure is old and well known in the art, a detailed description herein is believed unnecessary. By way of comment, it should be stated that in some forms of the mixer devices, the discharge pipe 15 enters the casing 10 through the upper portion thereof and discharges heated air downwardly, and the ports 12 and 13 become reversed, the upper port becoming the intake port for the aspirated air and the bottom port becoming the outlet for the mixer chamber.

As has been heretofore stated, rotary dampers or valves heretofore employed form, when partially opened, two spaced streams which move upwardly along the side walls of the conduit 15, meeting substantial frictional resistance and intermixing with substantial turbulence, greatly reducing the aspirating efficiency of the device. In the new structure shown, I provide a slide valve 16, to which is secured an operating handle 17. The valve 16 is provided with a circular aperture 18. To the bottom side of the valve 16 I cement or otherwise secure a felt pad 19 having an aperture 20 slightly smaller than the aperture 18 of valve 16, so that when the apertures are brought into general register, the inner edge portion 21 of the felt 19 projects inwardly of the edge of the valve 16 about aperture 18. The inwardly-extending ledge 21 of the felt strip 19 is found to eliminate whistling sounds and other noises which would otherwise be caused by the air passing by the raw edges of valve 16 about the aperture 18. The valve 16 and the felt strip 19 carried thereby rest upon a diaphragm part 22, which also is provided with an aperture 23 corresponding in diameter to the aperture 18 of valve 16. The diaphragm part 22 is provided on one side with a depending flange 24 and on the other side with an upwardly-extending flange 25.

Above the slide valve 16 is an upper diaphragm member 26 having a circular aperture 27 therein of substantially the same diameter as that of aperture 18 of slide valve 16. The member 26 is provided at its front with a downwardly-turned flange 28 and at its rear with an upwardly-turned flange 29 and at its ends with upwardly-turned flanges 30. On one side of the aperture 27, the plate member 26 is provided with a laterally-extending slot 31 adapted to receive the handle member 17, and wherein the base 32 of the handle member 17 is guided as the slide valve is moved laterally. To the bottom of the plate member 26 is cemented or otherwise secured a felt pad 33 having a cut-away portion 34 aligned with the slot 31 in plate 26. The felt 33 is provided with an aperture 35 which is slightly less in diameter than the apertures 27 and 23 of plates 26 and 22, respectively, so that there is a projecting ledge or edge 36 of the felt 33 inwardly of the edge portion of the plate member 26 and of the plate member 22. The inwardly-projecting edge 36, as indicated best in Fig. 1, is found to protect the metal edges of plates 22 and 26 about the apertures as air passes with high velocity through these openings, and prevents whistling sounds and other noises.

With the structure shown, the felt 33 protects the edges of the diaphragm members 22 and 26 about the apertures thereof against such whistling sounds, irrespective of the position of the slide valve. At the same time, the felt 19, which is secured to the slide valve 16, protects the raw edges of the metal plate 16 about the aperture 18 against such whistling noises, no matter what the position of the valve. The felt strips at the same time, by reason of their high resilience, maintain the slide valve 16 firmly between the diaphragm plates, preventing rattling and producing an effective seal. The frictional effect of the resilient pads also causes the valve to remain firmly in any position to which it is moved.

Instead of employing felt, as described in the embodiment shown, it will be understood that any suitable fabric or fiber material may be employed for the purposes described above in producing a seal between the valve parts, eliminating noise, etc.

To the bottom of the diaphragm plate 22 is secured a connector collar 37 having an outwardly-extending horizontal flange 38. The flange 38 may be secured to the bottom wall 39 of the casing 10, as shown more clearly in Fig. 1, by any suitable means such as sheet metal screws, welding, etc. To the upper diaphragm plate 26 I secure a plate 40 by welding or other suitable means, the plate being provided with an integral, upwardly-extending collar 41. The discharge pipe 15 is secured to the collar 41, as shown more clearly in Fig. 1. Similarly, the conduit leading from the source of high velocity air is secured within the collar 37 at the lower end of diaphragm plate 22. If desired, the casing 10 may be provided with a vertical stop 42 engageable with handle 17 at one end of its movement, and the handle 17 may be provided with a notch 43 adapted to engage the stop 42 as it is moved into contact therewith.

Operation

In the operation of the structure, the valve 16 may be initially in a lateral position abutting stop 42 with the opening 18 thereof substantially registering with the openings 23 and 27 of the plates 22 and 26, respectively, so that air blows in an unrestricted stream through the registering openings. In this position, whistling noises caused by the passing of high velocity air passing through the raw edges of the metal about the apertures are prevented by the inwardly-extending edge 21 of pad 19 and the edge 36 of pad 33. As the slide valve 16 is moved inwardly, a portion of the circular aperture passes between imperforate portions of the plates 22 and 26, while also an imperforate portion of the slide valve 16 passes over the registering openings 23 and 27 of plates 22 and 26. An elliptical air port is thus formed between the uncovered portions of the fixed diaphragm plates 22 and 26, and the advancing arcuate edge of the valve 22 about aperture 23. This elliptical opening is diminished or increased, depending upon the direction of lateral movement of slide valve 22. However, no matter in which direction the valve is moved, the resulting elliptical opening centers the air stream and there is always a single stream of air discharged upwardly through the conduit 15.

For a fully delivery of the heated air, it is desired to have the full diameter opening of the conduit. It is further desired that when the diameter of the conduit is reduced, this may be accomplished without losing the aspirating value of the air stream. It was surprising to find that upon reducing the diameter of the stream as the valve was moved inwardly to form an elliptical opening, actually there was an increase in the aspirating efficiency of the device. The increased high velocity of the stream resulting from its being reduced in diameter, without the production of turbulence which heretofore destroyed the aspirating efficiency, actually resulted in drawing in more air from the room into the mixing chamber and, within a limited field, gave improved results. Even when the size of the opening was greatly reduced, effective aspirating action was still brought about with substantially no turbulence.

By having one felt strip 33 fixed to at least one of the diaphragms so as to extend inwardly of the inner edges thereof about the apertures, whistling sound was avoided no matter in what position the valve was moved. Similarly, by cementing one of the felt strips to the slide valve itself, so that the inner edge of the felt about the aperture extends inwardly of the edges surrounding the aperture 18 of the valve, whistling sound was avoided irrespective of the position to which the valve was moved. At the same time, the two felt strips sealed the areas about the valve parts and urged them into tight relation, preventing rattling and holding the valve firmly within the position to which it was moved.

The employment of two members which are relatively movable and have arcuate surfaces therein about an aperture enables the operator to center a single stream of air while producing a stream which is generally elliptical or circular within the discharge conduit 15, whereby a minimum of turbulence or frictional resistance is encountered. While I prefer the circular openings described, it will be understood that openings of other shapes may be employed which give the centering effect described and the avoidance of frictional resistance. Instead of the fixed manually-operated handle 17 for the slide valve 16, it will be understood that power means or other means may be provided for reciprocating the slide plate 16.

While in the foregoing description, I have set forth specific structures in considerable detail for the purpose of illustrating an embodiment of the invention, it will be understood that such details of the structures may be varied widely by those skilled in the art without departing from the spirit of my invention.

I claim:

1. In aspirating apparatus, flow control means comprising a conduit, a fixed diaphragm member there-across having an aperture, a slide valve member engaging said diaphragm for sliding movement and having an aperture normally registering with the aperture of said diaphragm member, at least one of said members being provided with a resilient pad having an aperture of lesser diameter than the diameter of the apertures in said members to provide an inwardly-projecting pad edge adjacent the apertures of said members, the apertures of said members presenting opposed arcuate surfaces providing a generally circular opening changing to a generally elliptical opening when the valve is moved respectively from open toward closed position, and means for moving said valve.

2. The structure of claim 1, in which the resilient pad is secured to said valve member.

3. The structure of claim 1, in which the resilient pad member is secured to said diaphragm member.

4. The structure of claim 1, in which the diaphragm member comprises two plates, one on either side of said slide valve and in which the resilient pad is secured to the bottom of the uppermost plate.

5. In combination with an air mixer casing, flow control means comprising a pair of vertically spaced bottom and top plates secured across the bottom of said casing and provided with registering apertures, a slide valve mounted between said plates and also provided with a registering aperture, collars secured to said bottom and top plates adapted to receive conduit ends, and resilient sealing means between said valve and plates, said sealing means comprising a resilient pad secured to the bottom of said valve and having an aperture registering with the aperture of said valve but of smaller size to provide a perimetric edge portion extending inwardly thereof and a resilient pad secured to the uppermost of said plates and having an aperture registering with the aperture of said upper plate.

6. In air mixer apparatus, a casing providing a generally rectangular chamber having an inlet opening at one end thereof and an outlet opening at the other end thereof, a discharge pipe extending into one end of said casing adjacent the intake opening thereof, a diaphragm extending across one end of said casing adjacent the intake opening thereof and secured to said discharge conduit on one side and to an intake conduit on the other side, said diaphragm comprising a pair of plates spaced apart and having registering openings, a slide valve mounted between said plates and having an opening registering with the openings of said plates, sealing means between said valve and said plates, and means for reciprocating said valve, said sealing means comprising at least one pad secured to said valve and providing registering openings therewith, the opening in said pad being slightly smaller than the one in said valve to provide a perimetric edge portion extending inwardly thereof.

7. The structure of claim 6, in which the openings of said plates and valves are generally circular in contour.

8. In combination with a casing providing a mixer chamber of generally rectangular cross-section, the chamber having an intake at one end and an outlet at the other, a diaphragm plate extending across the lower end of said chamber and having an opening therein, a collar secured to said diaphragm plate and adapted to receive a high velocity air conduit, a slide valve mounted upon said diaphragm plate and having an opening therein aligned with the opening of said plate, a second diaphragm plate above said slide valve having also an opening registering with the opening of said first-mentioned diaphragm plate, a collar secured to the second-mentioned diaphragm plate and adapted to receive a discharge pipe extending into said chamber adjacent the intake opening thereof, a resilient fiber pad secured to the bottom of said slide valve and having an opening registering with the opening of the valve but of slightly less diameter, a second flexible fiber pad secured to the bottom of the second-mentioned diaphragm plate and having an opening slightly less than the diameter of the opening of said second-mentioned diaphragm plate, and means for reciprocating said slide valve.

9. In an air flow system, a valve structure adapted for use in regulating the flow of air therein, comprising a diaphragm plate interposed in the path of air flow and having an opening therein adapted to have air flow therethrough, a valve plate provided with an opening therethrough and being slideable relative to said diaphragm plate, a fibrous, resilient sealing pad provided by said valve structure and having an opening therethrough of smaller size than the openings through the plates to provide an inwardly extending perimetric edge when the openings are all in register, means for holding said pad in position with respect to one of the plates with the openings of that plate and the pad in register, and means for sliding said valve plate from open position wherein all of said openings are in register, toward closed position wherein the openings in said diaphragm and valve plates are out of register.

10. The structure of claim 9 in which said pad is secured to said valve plate.

11. In combination with an air mixer casing, a pair of vertically spaced bottom and top plates secured across the bottom of said casing and being provided with registering apertures, a slide plate mounted between said pair of plates and being provided also with an aperture of substantially the same dimensions as the aforesaid registering apertures and being selectively movable into register therewith, collars secured to said bottom and top plates and being adapted to receive conduit ends, and resilient sealing means between said slide plate and plate structures, said sealing means having apertures therein of smaller opening than all of the aforesaid apertures to provide when in register therewith, a resilient sealing means edge extending inwardly thereof.

References Cited in the file of this patent

UNITED STATES PATENTS

| 1,054,103 | Force | Feb. 25, 1913 |
| 1,867,807 | Campbell | July 19, 1932 |
| 2,111,836 | Boyd | Mar. 22, 1938 |
| 2,344,747 | Sperry et al. | Mar. 21, 1944 |
| 2,442,963 | Sewell et al. | June 8, 1948 |
| 2,635,523 | Hunter | Apr. 21, 1953 |

FOREIGN PATENTS

| 48,983 | France | Oct. 5, 1938 |
| 515,829 | Germany | Jan. 13, 1931 |